(12) United States Patent
Kato et al.

(10) Patent No.: US 8,370,015 B2
(45) Date of Patent: Feb. 5, 2013

(54) HYBRID INDUSTRIAL VEHICLE

(75) Inventors: Norihiko Kato, Kariya (JP); Yukikazu Koide, Kariya (JP)

(73) Assignee: Kabushiki Kaisha Toyota Jidoshokki, Aichi-ken (JP)

(*) Notice: Subject to any disclaimer, the term of this patent is extended or adjusted under 35 U.S.C. 154(b) by 246 days.

(21) Appl. No.: 12/956,983

(22) Filed: Nov. 30, 2010

(65) Prior Publication Data

US 2011/0137502 A1 Jun. 9, 2011

(30) Foreign Application Priority Data

Dec. 3, 2009 (JP) ................................. 2009-275435

(51) Int. Cl.
*B60L 9/00* (2006.01)
(52) U.S. Cl. ........................................................ 701/22
(58) Field of Classification Search ...................... 701/22
See application file for complete search history.

(56) References Cited

U.S. PATENT DOCUMENTS

| | | | |
|---|---|---|---|
| 7,278,503 B1* | 10/2007 | Kato et al. | 180/65.22 |
| 7,677,340 B2* | 3/2010 | Ichijo et al. | 180/65.235 |
| 2006/0069488 A1 | 3/2006 | Sychra et al. | |
| 2008/0041047 A1 | 2/2008 | Kato | |
| 2009/0159358 A1* | 6/2009 | Hosotani | 180/367 |
| 2010/0091015 A1* | 4/2010 | Heidel | 345/419 |
| 2011/0056755 A1* | 3/2011 | Futahashi et al. | 180/65.25 |

FOREIGN PATENT DOCUMENTS

| | | |
|---|---|---|
| EP | 1974979 A2 | 10/2008 |
| JP | 10-014010 A | 1/1998 |
| JP | 2007-210799 A | 8/2007 |
| JP | 2009-040211 A | 2/2009 |

OTHER PUBLICATIONS

European Search Report for corresponding European Application No. 10193076.6, dated Apr. 4, 2011.

* cited by examiner

*Primary Examiner* — Hussein A. Elchanti
(74) *Attorney, Agent, or Firm* — Sughrue Mion, PLLC

(57) ABSTRACT

A hybrid industrial vehicle including an engine, generator motor, battery, and a travel motor. A first generated power computation unit computes a deceleration rate based required generated power based on the travel power and charge power of the battery. A second generated power computation unit computes an actual power based required generated power based on used power used by the travel motor and the charge power of the battery. A generated power control unit controls the generator motor so that the generated power of the generator motor becomes equal to a total generated power determined from the deceleration rate based required generated power and actual power based required generated power. An engine rotation speed control unit controls rotation speed of the engine to be greater than or equal to a required cargo handling engine rotation speed.

4 Claims, 3 Drawing Sheets

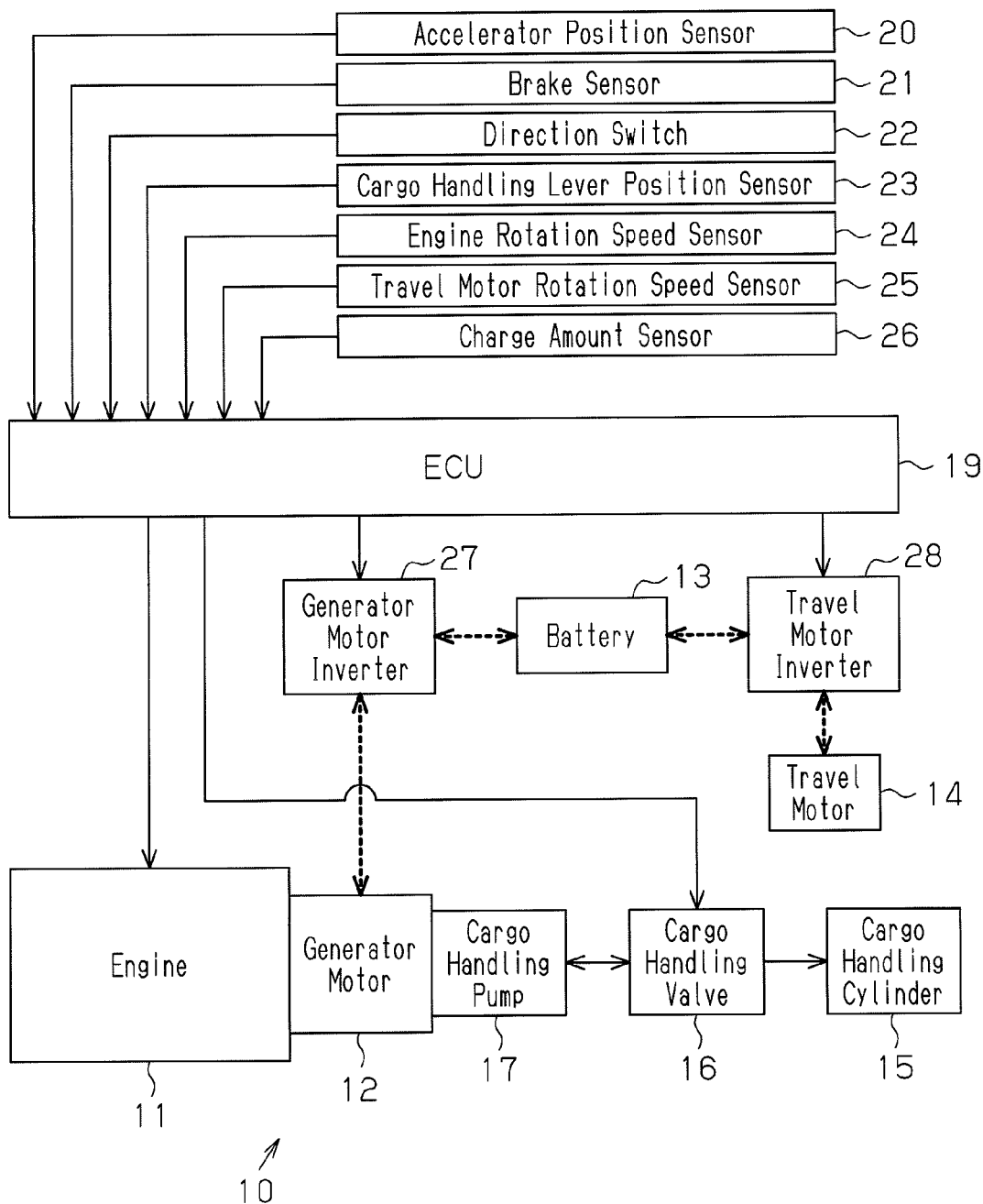

HYBRID INDUSTRIAL VEHICLE

BACKGROUND OF THE INVENTION

The present invention relates to a hybrid industrial vehicle, and more particularly, to a hybrid industrial vehicle that charges a battery with a generator motor connected to an engine, executes travel control by driving a travel motor using power of the battery or the power generated by the generator motor, and executes cargo handing control by driving a cargo handling pump using the engine and the generator motor.

A known hybrid forklift combines a so-called series hybrid system for traveling and a parallel hybrid system for cargo handling. In such a hybrid forklift, the engine and a generator motor, which is coupled to the engine, drives a cargo handling pump. Further, the engine and the generator motor are controlled to charge and discharge a battery and supply power to, a travel motor.

Generally, in an industrial vehicle such as a forklift that handles cargoes, the depression amount of an accelerator determines the vehicle speed. This allows for the same vehicle speed to be obtained with the same depression amount of the accelerator regardless of the cargo handled by the industrial vehicle increasing or decreasing the load applied thereto.

A hybrid forklift controls changes in the vehicle speed by providing the travel motor with acceleration instructions and deceleration instructions. The power of the travel motor required to control the vehicle speed changes in accordance with the acceleration or deceleration instruction. This results in the battery being charged or discharged by the power corresponding to the difference between the travel motor power required for traveling and the power generated by the generator motor. When a delay occurs in the control or response of the engine and generator motor relative to a change in the travel motor power, a large amount of power may be drained from the battery. Further, when the forklift is drastically decelerated from a high speed state, the travel motor power suddenly changes and generates a large regenerative power. In this case, a large amount of power is returned to the battery.

However, the amount of power that may be charged to the battery (tolerable charging power) is limited in accordance with the state of the battery. This limit must not be exceeded when vehicle speed control is executed. For example, when vehicle acceleration is controlled so that the power charged to or discharged from the battery does not exceed the limit, the power supplied to the travel motor may be restricted to slow the acceleration. However, when the vehicle is decelerating, the vehicle must be stopped when the driver intends to do so. Thus, the power supplied to the travel motor cannot be restricted so that the power charged to or discharged from the battery does not exceed the limit.

Japanese Laid-Open Patent Publication No. 2009-40211 discloses a hybrid forklift that prevents the power of the battery from exceeding a set value, such as a rated value, subsequent to charging while maintaining the desired vehicle deceleration rate. When the forklift detects at least one of a plurality of operations being performed, namely, the brake being applied, the accelerator being released, and a switch back operation being performed, the forklift shifts to regenerative power control. In this case, the forklift determines whether or not there is a need to perform a process for reducing the power charged to the battery. When determining that such a reduction process must be performed, the forklift executes at least one of the following processes:

(1) set an engine output command value to 0;
(2) perform fuel cut-off; and
(3) hold the generator motor at the present rotation speed with power stored in the battery or drive the generator motor with power stored in the battery so that the rotation speed decelerates at a rate smaller than a predetermined deceleration rate.

When determining that the reduction process no longer needs to be performed, the forklift ends the reduction process and returns to normal control.

In the forklift of the above publication, the process for reducing the power charged to the battery during the regenerative power control prevents the battery from being overcharged. However, in the reduction process, consideration is not made to controlling the power generated by the generator motor in accordance with a target value. This is because the generator motor generates power from the torque of the inertial rotation it produces when setting the engine output command value to 0 or when performing fuel cut-off. Thus, when cargo handling is required, the necessary amount of rotation produced by the pump may not be obtained. As a result, to obtain the required pump rotation amount when cargo handling is required, the generator motor uses the power of the battery to produce rotation. This may consume power in an unnecessary manner. Further, in the reduction process for forklift of the above publication, consideration is not made to whether or not the power charged to the battery when the travel motor is driven for regenerative power generation exceeds the maximum power tolerated for charging (tolerable charging power). When the forklift carries cargoes, the weight of the vehicle may become 1.5 to 2 times greater than when it is not carrying any cargoes. A significant change in the vehicle weight significantly changes the regenerative power of the travel motor and significantly changes the power charged to the battery. Thus, the sum of the power charged to the battery during regeneration (i.e., regenerative power of the travel motor) and the power generated by the generator motor must be controlled so as not to exceed the tolerable charging power of the battery.

SUMMARY OF THE INVENTION

It is an object of the present invention to provide a hybrid vehicle that employs a series hybrid system for traveling and charges a battery in a preferable manner when the vehicle is decelerating without restricting the deceleration rate.

One aspect of the present invention is a hybrid industrial vehicle including an engine, a generator motor coupled to the engine, a battery charged by the generator motor, a travel motor driven by power of the battery or power generated by the generator motor, and a cargo handling pump driven by the engine and the generator motor. The hybrid industrial vehicle further includes a required braking amount detection unit, a required cargo handling amount detection unit, a deceleration rate computation unit that computes a required deceleration rate based on a detection signal of the required braking amount detection unit, and a travel power computation unit that computes travel power based on the required deceleration rate. A first generated power computation unit computes a deceleration rate based required generated power based on the travel power and charge power of the battery. A second generated power computation unit computes an actual power based required generated power based on used power used by the travel motor and the charge power of the battery. A generated power control unit controls the generator motor so that the generated power of the generator motor becomes equal to a total generated power determined from the deceleration rate based required generated power and the actual power based required generated power. An engine rotation speed control unit controls rotation speed of the engine to be greater than or equal to a required cargo handling engine rotation speed computed based on a detection signal of the required cargo handling amount detection unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a block diagram showing the structure of a hybrid forklift according to a further embodiment of the present invention.

DETAILED DESCRIPTION OF THE PREFERRED EMBODIMENTS

A hybrid forklift, which employs a series hybrid system for traveling and a parallel hybrid system for cargo handling, according to a first embodiment of the present invention will now be discussed with reference to FIGS. 1 and 2.

Figure 1:
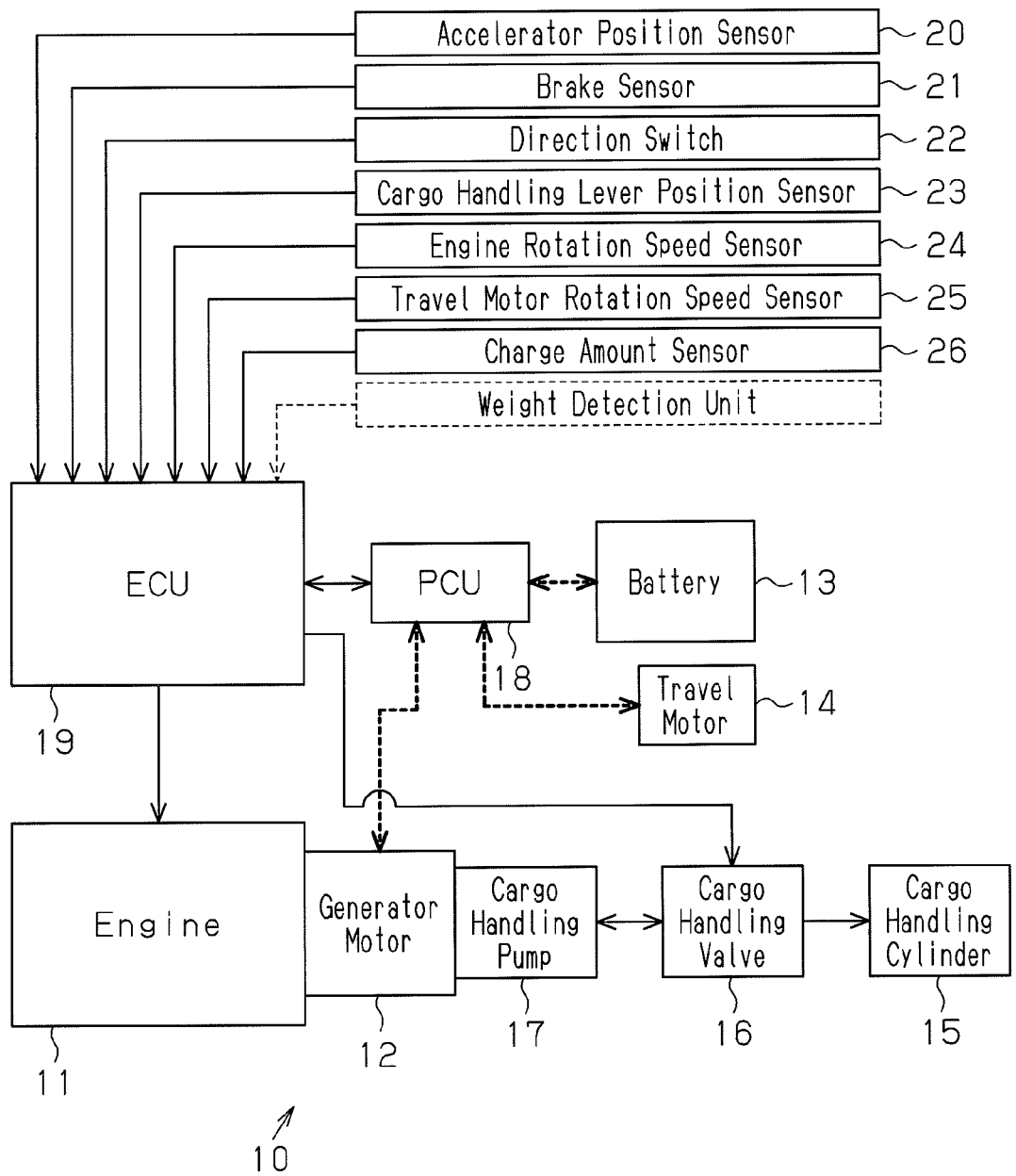
FIG. 1 is a block diagram showing the structure of a hybrid forklift according to one embodiment of the present invention.
Figure 2:
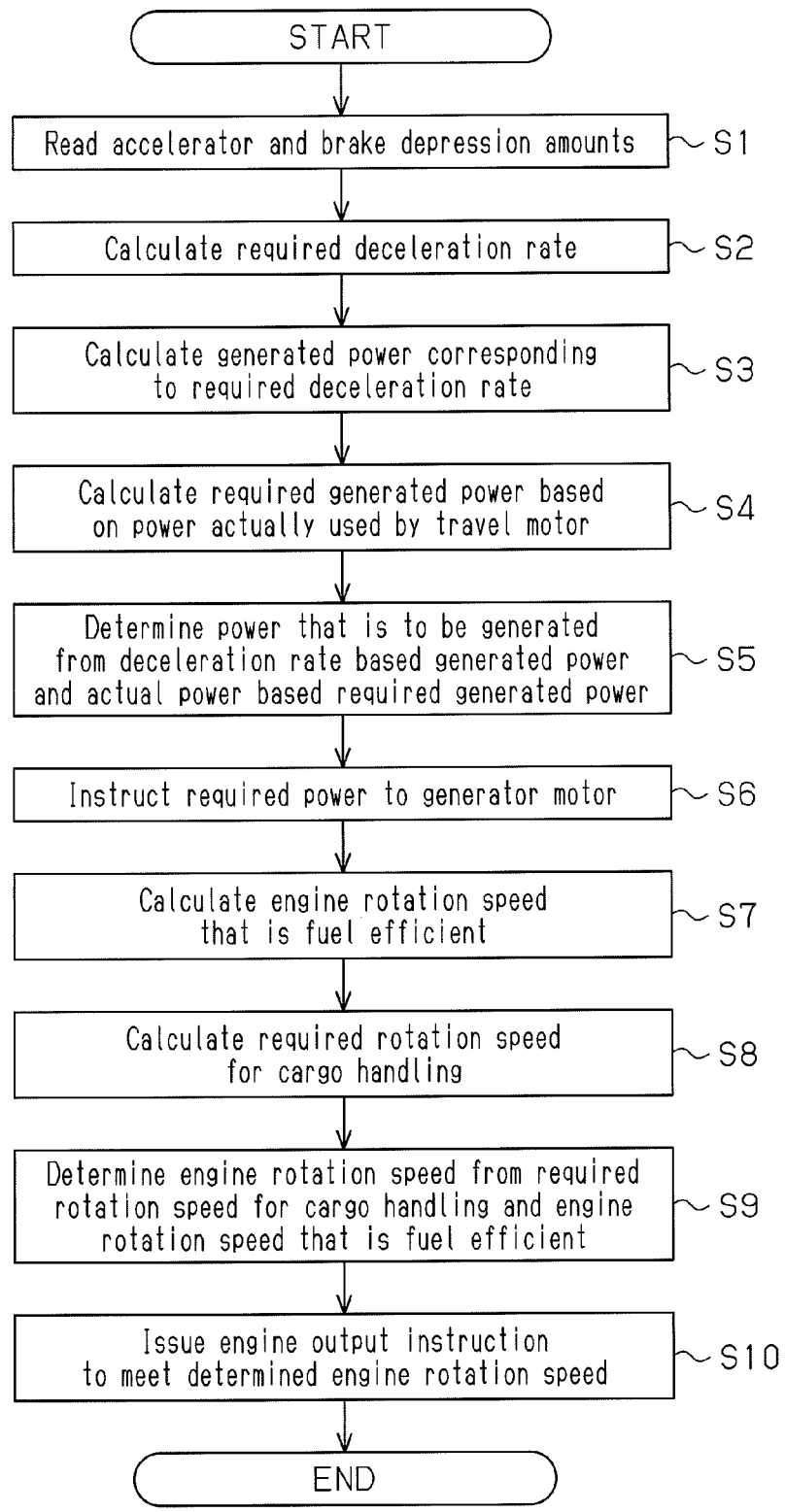
FIG. 2 is a flowchart showing the control executed when the forklift decelerates.

Referring to FIG. 1, a hybrid forklift 10 includes an engine 11, a generator motor 12, a battery 13, and a travel motor 14. The generator motor 12 is coupled to the engine 11. A cargo handling pump 17, which supplies a cargo handling cylinder 15 with operational oil via a cargo handling valve 16, is coupled to the generator motor 12.

A power control unit (PCU) 18 connects the generator motor 12 and the travel motor 14 to the battery 13. The PCU 18 includes an inverter, a boost converter, and a controller. The power generated by the generator motor 12 is charged to the battery 13 or supplied to the travel motor 14 through the PCU 18. The power of the battery 13 is supplied to the generator motor 12 or the travel motor 14 through the PCU 18 as well. As the power required for the travel motor 14, the PCU 18 gives priority to the power generated by the generator motor 12 and supplied to the travel motor 14. When power is still lacking, the PCU 18 controls the inverter and boost converter to supply the travel motor 14 with power from the battery 13.

The generator motor 12 functions as a power generator when driven by the engine 11 and functions as a motor when driven by the power from the battery 13. When the generator motor 12 functions as a generator, the engine 11 serves as a drive source for the generator motor 12 and the cargo handling pump 17. When the generator motor 12 functions as a motor, the engine 11 and the generator motor 12 both serve as the drive source of the cargo handling pump 17 or just the generator motor 12 serves as the drive source of the cargo handling pump 17. An AC power generator is used as the generator motor 12. When generating power, the generator motor 12 controls a field current to control the amount of generated power.

The ECU 19 that controls the entire forklift 10 is electrically connected to the engine 11, the cargo handling valve 16, and the PCU 18. Sensors and switches such as an accelerator position sensor 20, a brake sensor 21, a direction switch 22, a cargo handling lever position sensor 23 serving as a required cargo handling amount detection unit, an engine rotation speed sensor 24, a travel motor rotation speed sensor 25, and a charge state sensor 26 that detects an amount of charge of the battery 13 are electrically connected to the ECU 19.

The accelerator position sensor 20 detects the depression amount of the accelerator (acceleration pedal), namely, the accelerator depression amount. The brake sensor 21 detects the depression amount of the brake pedal, namely, the brake depression amount. The accelerator and brake depression amounts reflect a braking amount required by the driver for the vehicle. Accordingly, the accelerator position sensor 20 and the brake sensor 21 function as a required brake amount detection unit. The cargo handling lever position sensor 23 detects the operation amount of a cargo handling lever, that is, a cargo handling amount required by the driver for the vehicle. The required cargo handling amount is the cargo handling speed desired by the driver.

The ECU 19 functions as a deceleration rate computation unit that computes a required deceleration rate based on detection signals of the accelerator position sensor 20 and the brake sensor 21. The required deceleration rate is computed using an equation or a map showing the relationship of the accelerator depression amount, the brake operation amount, and the deceleration rate.

The ECU 19 computes the required deceleration rate when the vehicle is decelerating. Then, the ECU 19 calculates the generated power Pg (kW) of the generator motor 12 corresponding to the required deceleration rate.

The travel power Pm (kW) required by the travel motor 14 when the vehicle travels is expressed by the equation shown below using the generated power Pg (kW) of the generator motor 12 and the charge power W (kW) of the battery 13, which indicates the power of the battery 13.

$$Pm = W + Pg \qquad (1)$$

Based on the vehicle's equation of motion, the travel power Pm (kW) of the travel motor 14 is expressed by the equation shown below using the torque T (Nm) of the motor shaft and the rotation speed N (rpm) of the travel motor 14. The torque T is determined in correspondence with the required deceleration rate.

$$Pm = N \times T / (60/2\pi \times 1000) \qquad (2)$$

The ECU 19 uses the required deceleration rate when the vehicle decelerates and equation (2) to compute the travel power Pm (kW). The computation takes into consideration the rotational inertia weight (kg) of the vehicle. The ECU 19 assigns the travel power Pm, which is calculated from equation (2), to equation (1) and calculates a deceleration rate based required generated power Pg1 (kW).

Further, the ECU 19 calculates an actual power based required generated power Pg2 (kW) based on the actual power used by the travel motor 14, which changes as the vehicle speed changes.

A total generated power Pg3 is calculated from the deceleration rate based required generated power Pg1 and the actual power based required generated power Pg2.

The ECU 19 functions as a travel power computation unit, which computes the travel power based on the required deceleration rate computed during deceleration, a first generated power computation unit, which computes the deceleration rate based required generated power based on the travel power and the power of the battery 13, and a second generated power computation unit, which computes the actual power based required generated power based on the power used by the travel motor 14 and the power of the battery 13.

Further, the ECU 19 functions as a generated power control unit, which controls the generator motor 12 with the total generated power determined from the deceleration rate based required generated power and the actual power base required generation power.

The ECU 19 also functions as an engine rotation speed control unit, which controls the speed of the rotation produced by the engine 11 to be greater than or equal to a required cargo handling engine rotation speed computed based on a detection signal of the cargo handling lever position sensor. Based on the detection signal of the cargo handling lever position sensor, the ECU 19 computes the required cargo handling engine rotation speed using a relational equation or a map. Then, the ECU 19 obtains a required power generation engine rotation speed that drives the generator motor 12 so that the generated power of the generator motor 12 becomes equal to the total generated power in a state in which the fuel consumption of the engine 11 is satisfactory. The ECU 19 also controls the engine 11 so that the rotation speed of the engine 11 becomes equal to the total engine rotation speed determined from the required cargo handling engine rotation speed and the required power generation engine rotation speed.

The accelerator position sensor 20, brake sensor 21, cargo handling lever position sensor 23, travel motor rotation speed sensor 25, and ECU 19 form a power generation controller.

The travel motor 14 and a travel unit (not shown), which is driven by the travel motor 14, perform a travel operation with the hybrid forklift 10. The travel motor 14 is driven by drive power, which is supplied via the PCU 18 from the battery 13 or the generator motor 12. Further, the travel motor 14 generates regenerative power when the forklift 10 decelerates. The regenerative power is charged via the PCU 18 to the battery 13.

The hybrid forklift 10 performs cargo handling using the cargo handling pump 17, the cargo handling cylinder 15 that lowers and lifts a fork (not shown), and the cargo handling valve 16 that distributes the operational oil from the cargo handling pump 17 to the cargo handling cylinder 15.

The operation of the power generation controller will now be discussed.

The ECU 19 generates instructions to drive the engine 11, drive and produce rotation with the generator motor 12 and the cargo handling pump 17, and charge the battery 13 via the PCU 18 with the power generated by the generator motor 12. The cargo handling pump 17, which is constantly driven when the driveshaft of the engine 11 is rotating, delivers operational oil to the cargo handling valve 16. Based on a signal from the cargo handling lever position sensor 23, the ECU 19 instructs the open degree of the cargo handling valve 16 to operate the cargo handling cylinder 15 and perform cargo handling. When cargo handling is not performed, the operation oil flows through the cargo handling valve 16 and returns to an operational oil tank.

When the hybrid forklift 10 travels, based on a signal from the accelerator position sensor 20, the ECU 19 supplies the travel motor 14 with drive power from the battery 13 via the PCU 18 in accordance with the depression amount of the acceleration pedal. The drive power drives the travel motor 14. As a result, the travel unit, which is coupled to the travel motor 14, drives the forklift 10 and performs a travel operation. When the forklift 10 decelerates, the regenerative power generated by the travel motor 14 charges the battery 13 via the PCU 18. In this case, power generation control is executed so that the power charged to the battery 13 does not exceed the maximum power value (tolerable charge power), which is tolerated for charging by the battery 13. In other words, power generation control is executed so that the power of the charged battery 13 does not exceed the maximum power (rated value) of the battery 13.

The power generation control of the generator motor 12 executed when the forklift 10 decelerates will now be discussed with reference to the flowchart of FIG. 2.

In step S1, the ECU 19 reads the detection signals of the accelerator position sensor 20 and the brake sensor 21. In step S2, the ECU 19 calculates the required deceleration rate from the accelerator depression amount and the brake depression amount. Then, in step S3, the ECU 19 calculates the generated power that corresponds to the required deceleration rate. That is, the ECU 19 calculates the deceleration rate based required generated power. In detail, the ECU 19 computes the travel power based on the torque T determined in correspondence with the required deceleration rate. Then, the ECU 19 computes the deceleration rate based required generated power based on the travel power and the power of the battery 13. In this manner, the ECU 19 in step S3 functions as the travel power computation unit and the first generated power computation unit.

In step S4, the ECU 19 calculates the actual power based required generated power based on the used power (actual used power) of the travel motor 14 and the power of the battery 13. The actual used power is calculated from the voltage value detected by a voltage sensor arranged in the PCU 18 and an instruction value for the current output from the PCU 18 to the travel motor 14. The ECU 19 functions in step S4 as the second generated power computation unit.

In step S5, the ECU 19 determines the total generated power from the generated power that corresponds to the required deceleration rate (the deceleration rate based required generated power) and the actual power based required generated power. In detail, the ECU 19 determines the total generated power by averaging the deceleration rate based required generated power and the actual power based required generated power with a predetermined ratio. For example, the sum of 50% of the deceleration rate based required generated power and 50% of the actual power based required generated power is determined as the generated power (total generated power) that is to be generated by the generator motor 12.

In step S6, the ECU 19 instructs the generator motor 12 of the required power. When the generated power determined in step S5 is positive, the field current required to limit the generated power at the determined value is supplied to the generator motor 12. When the generated power determined in step S5 is negative, the ECU 19 determines that the generated power is to be consumed by the generator motor 12 and thereby powers the generator motor 12 to consume the power. In this case, the drive force of the generator motor 12 is transmitted to and consumed by the engine 11. The value of the field current and the power supplied during powering are obtained from a stored map, which is plotted beforehand through experiments.

In step S7, the ECU 19 obtains from the map the engine rotation speed that is fuel efficient. In step S8, the ECU 19 receives the detection signal of the cargo handling lever position sensor 23 to calculate the required rotation speed necessary for handling cargoes. Then, in step S9, the ECU 19 determines a target engine rotation speed based on the required cargo handling engine rotation speed, which is required for cargo handling, and the engine rotation speed, which is fuel efficient. More specifically, when the required cargo handling engine rotation speed is greater than the engine rotation speed that is fuel efficient, the required cargo handling engine rotation speed is determined as the target engine rotation speed. When the required cargo handling engine rotation speed is less than or equal to the engine rotation speed that is fuel efficient, the engine rotation speed that is fuel efficient is determined as the target engine rotation speed. In step S10, the ECU 19 issues an engine output instruction so that the actual engine rotation speed becomes equal to the target engine rotation speed. When the target engine rotation speed is determined as a value that is greater than the required cargo handling engine rotation speed, the ECU 19 controls the valve 16 and returns surplus operation oil to the operational oil tank.

A single power generation control cycle is executed in this manner during deceleration. The ECU 19 repeats steps S1 to S10 in predetermined cycles.

The generated power is determined in correspondence with the required deceleration rate computed from the depression of the acceleration pedal and brake pedal by the driver. This limits the power that flows to the battery 13. When the required deceleration rate is large, the fuel supply to the engine 11 is stopped, and the generator motor 12 consumes power. Accordingly, even when the forklift is generating regenerative power while traveling, the power that flows to the battery 13 is prevented from exceeding the tolerable charge power. This protects the battery 13 and ensures the deceleration rate.

If the generated power of the generator motor 12 were to be feedback controlled based on the used power (actual power) of the travel motor 14 so that the sum of the regenerative power of the travel motor 14 and the generated power of the generator motor 12 does not exceed the tolerable charge power of the battery 13, the required generated power for the generator motor 12 does not decrease unless the used power (actual power) of the travel motor 14 decreases. As a result, there would be a tendency for a time lag to occur when controlling the generated power of the generator motor 12 to an appropriate value. Further, if the generated power of the generator motor 12 were to be controlled to be equal to the generated power that is based on the required deceleration rate, that is, if feed-forward control were to be executed, a change in the vehicle weight would change the generated power. With a forklift, the vehicle weight may change in the range of approximately 1.5 to 2 times when handling cargoes. Thus, the weight of the handled material must be detected to adjust the generated power accordingly. Otherwise, the generated power may differ greatly from the estimated value.

However, in this embodiment, when controlling the travel motor 14 during deceleration, the ECU 19 determines the power that is to be generated by the generator motor 12 based on the deceleration rate based required generated power, which is based on the required deceleration rate, and the actual power based required generated power. In other words, the generator motor 12 is controlled using the advantages of feed-forward control and feedback control. Thus, during deceleration, the battery 13 is charged with power that does not exceed the tolerable charge power in accordance with the power of the battery 13 without limiting the deceleration rate. The control of the generator motor 12 based on the deceleration rate based required generated power corresponds to feed-forward control, and the control of the generator motor 12 based on the actual power base required power corresponds to feedback control.

The present embodiment has the advantages described below.

(1) The ECU 19 computes the required deceleration rate from the detection signal of the required braking amount detection unit (i.e., the accelerator position sensor 20 and the brake sensor 21). Then, the ECU 19 computes the travel power based on the required deceleration rate. The ECU 19 also computes the deceleration rate based required generated power based on the travel power and the power of the battery 13. Further, the ECU 19 computes the actual power based required generated power based on the used power of the travel motor 14 and the power of the battery 13 and controls the generator motor 12 with the total generated power determined from the acceleration rate based required generated power and the actual power based required generated power. Accordingly, the ECU 19 controls the generator motor 12 using the advantages of feed-forward control and feedback control when controlling deceleration of the travel motor 14. Thus, the power charged to the battery 13 is prevented from exceeding the tolerable charge power, which changes in accordance with the state of the battery 13, without limiting the deceleration rate when the vehicle decelerates. Further, the power charged to the battery 13 is prevented from exceeding the tolerable charge power just by changing the control program of the ECU 19 and does not need additional components. Thus, in comparison to when additional components are necessary, costs may be decreased. Further, changes may be made to the control program by modifying part of the conventional feedback control.

(2) The ECU 19 functions as an engine rotation speed control unit that controls the engine rotation speed to be greater than or equal to the required cargo handling engine rotation speed, which is computed from the detection signal of the required cargo handling amount detection unit (cargo handling lever position sensor 23). Thus, the ECU 19 executes deceleration control in a state ensuring the cargo handling performance.

(3) The ECU 19 limits the engine rotation speed based on the required cargo handling engine rotation speed, which is computed from the detection signal of the cargo handling lever position sensor 23, and the engine rotation speed that drives the generator motor 12 in a state in which the engine 11 is fuel efficient. Accordingly, when cargo handling is required, the engine 11 is driven with better fuel efficiency than when just limiting the engine rotation speed to the required cargo handling engine rotation speed, which is computed from the detection signal of the cargo handling lever position sensor 23.

(4) The ECU 19 computes the generated power that corresponds to the required deceleration rate during deceleration with an equation that uses the equation of motion of the vehicle. In this case, the force generated by the deceleration rate is computed by multiplying the sum of the vehicle weight and rotational inertia weight by the deceleration rate instead of multiplying the vehicle weight by the deceleration rate. Accordingly, the generated power corresponding to the required deceleration rate is calculated with further accuracy.

It should be apparent to those skilled in the art that the present invention may be embodied in many other specific forms without departing from the spirit or scope of the invention. Particularly, it should be understood that the present invention may be embodied in the following forms.

Referring to FIG. 3, a generator motor inverter 27 and a travel motor inverter 28 may be used in lieu of the PCU 18 and be controlled by the ECU 19. In this case, when generating power with the generator motor 12, the ECU 19 controls the generator motor inverter 27 so that the battery 13 is charged via the generator motor inverter 27. When the generator motor 12 is powered, the ECU 19 controls the generator motor inverter 27 so that the generator motor 12 is supplied with power from the battery 13 via the generator motor inverter 27. Further, when driving the travel motor 14, the ECU 19 controls the travel motor inverter 28 to supply power from the battery 13 to the travel motor 14 and thereby drive the travel motor 14 with the target rotation speed. The ECU 19 controls the travel motor inverter 28 so that the battery 13 is efficiently charged with the regenerative power generated by the travel motor 14.

Instead of a structure that directly couples the output shaft of the engine 11 with the rotation shaft of the generator motor 12, the output shaft may be connected via a clutch to the rotation shaft of the generator motor 12. In this structure, when only the generator motor 12 is powered to drive the cargo handling pump 17, the generator motor 12 may be driven in a state in which the clutch is disconnected to prevent unnecessary power consumption.

When consuming surplus electric power, a load other than the generator motor 12 may be driven. For example, in a vehicle using a power steering motor, such power may be used to drive the power steering motor. In this case, a larger amount of surplus power may be consumed.

Further, when the surplus electric power is consumed by powering the generator motor 12, the fuel delivered to the engine 11 does not have to be completely cut off, and a slight amount of fuel may be supplied to the engine 11.

The layout of devices such as the engine 11, the generator motor 12, and the cargo handling pump 17 is not limited to the layout illustrated in the drawings. For example, the generator motor 12 does not have to be arranged coaxially with the engine 11 and may be arranged beside the engine 11. In this case, the engine 11 and the generator motor 12 are coupled to each other by a power transmission means such as gears and a belt.

In step S9, when determining the engine rotation speed, which is based on the required cargo handling engine rotation speed required for cargo handling, and the engine rotation speed, which is fuel efficient, the engine rotation speed may be determined by the required cargo handling engine rotation speed required for cargo handling regardless of the fuel efficiency.

As an equation for computing the generated power corresponding to the required deceleration rate during deceleration, for example, an equation that does not take into consideration the rotational inertia weight of the vehicle may be used.

When obtaining the generated power corresponding to the required deceleration rate during deceleration, instead of using an equation derived from the equation of motion of the vehicle, a map showing the relationship of the deceleration rate and the generated power obtained beforehand through experiments or a relational equation may be used.

The required braking amount detection unit does not necessarily have to include both the accelerator position sensor 20 and the brake sensor 21. For example, the accelerator position sensor 20 may be eliminated, and the required deceleration rate may be computed from only the brake depression amount detected by the brake sensor 21. Alternatively, a change in the accelerator depression amount may be computed from the detection signal of the accelerator position sensor 20. As another option, the required deceleration rate may be computed from the change in the accelerator depression amount.

When an accelerator operation and a brake operation are performed with a single operation means, the operation amount of the operation means may be detected by the required braking amount detection unit. Further, the required deceleration rate may be computed based on the detection signal of the required braking amount detection unit.

In step S5, the power generated by the generator motor 12 based on the deceleration rate based required generated power and the actual power based required generated power based on the deceleration rate may be determined in a different manner. For example, the generated power of the generator motor 12 may be determined from a simple average of the two parameters, namely, from the sum of the 50% of the deceleration rate based required generated power and 50% of the actual power based required generated power.

Instead of executing steps S1 to S10 in predetermined cycles, a step may be included between steps S1 and S2 to have the ECU 19 determine whether or not the acceleration depression amount and the brake depression amount differ from the previous cycle. When at least either one of the acceleration depression amount and the brake depression amount differs from the previous cycle, the ECU 19 executes step S2 and the subsequent steps. When the acceleration depression amount and the brake depression amount are the same as the previous cycle, the ECU 19 does not execute step S2 and the subsequent steps and ends processing in the present cycle.

A current sensor may be used to detect the current supplied to the travel motor 14. In this case, when computing the actual used power, the value detected by the current sensor may be used as the value of the current supplied to the travel motor 14.

A weight detection unit may be used to detect the weight of the cargo carried by the forklift 10. In this case, when computing the deceleration rate based required generated power corresponding to the required deceleration rate during deceleration, the weight of the handled cargoes may be reflected to the deceleration rate based required generated power. This allows for the power generated by the generator motor 12 to be determined as a further suitable value.

Various types of rechargeable batteries, such as a nickel-metal hydride battery, a lithium-ion battery, and a lead-acid battery, may be used as the battery 13.

The present invention is not limited to forklifts and may also be applied to other hybrid industrial vehicles that perform cargo handling and other tasks.

The present examples and embodiments are to be considered as illustrative and not restrictive, and the invention is not to be limited to the details given herein, but may be modified within the scope and equivalence of the appended claims.

What is claimed is:

1. A hybrid industrial vehicle comprising:
   an engine;
   a generator motor coupled to the engine;
   a battery charged by the generator motor;
   a travel motor driven by power of the battery or power generated by the generator motor;
   a cargo handling pump driven by the engine and the generator motor;
   a required braking amount detection unit;
   a required cargo handling amount detection unit;
   a deceleration rate computation unit that computes a required deceleration rate based on a detection signal of the required braking amount detection unit;
   a travel power computation unit that computes travel power based on the required deceleration rate;
   a first generated power computation unit that computes a deceleration rate based required generated power based on the travel power and charge power of the battery;
   a second generated power computation unit that computes an actual power based required generated power based on used power used by the travel motor and the charge power of the battery;

a generated power control unit that controls the generator motor so that the generated power of the generator motor becomes equal to a total generated power determined from the deceleration rate based required generated power and the actual power based required generated power; and an engine rotation speed control unit that controls rotation speed of the engine to be greater than or equal to a required cargo handling engine rotation speed computed based on a detection signal of the required cargo handling amount detection unit.

2. The hybrid industrial vehicle according to claim 1, wherein the engine rotation speed control unit controls the rotation speed of the engine so as to become equal to a total engine rotation speed determined from the required cargo handling engine rotation speed and a required power generation engine rotation speed, which drives the generator motor so that the generated power of the generator motor becomes equal to the total generated power in a state in which the engine is fuel efficient.

3. The hybrid industrial vehicle according to claim 1, wherein the first generated power computation unit uses an equation derived from the motion of equation of the vehicle to compute the deceleration rate based required generated power that corresponds to the required deceleration rate.

4. The hybrid industrial vehicle according to claim 3, further comprising:

a weight detection unit that detects the weight of a handled cargo, wherein the weight of the handled cargo is added to the vehicle weight when computing the deceleration rate based required generated power that corresponds to the required deceleration rate during deceleration.

* * * * *